United States Patent [19]

Giordano et al.

[11] 3,941,431

[45] Mar. 2, 1976

[54] INERTIA AND LOAD RESPONSIVE DEVICE FOR LIMITING BRAKING PRESSURE

[75] Inventors: Jean Louis Giordano, Noisy-le-Roi; Michel Guettier, Rueil, both of France

[73] Assignees: Regie Nationale des Usines Renault; Automobiles Peugeot, both of France

[22] Filed: May 22, 1974

[21] Appl. No.: 472,120

[30] Foreign Application Priority Data

June 5, 1973 France .............................. 73.20413

[52] U.S. Cl................ 303/24 A; 188/195; 188/349; 303/6 C; 303/22 R; 303/24 F
[51] Int. Cl.[2] ......................................... B60T 8/12
[58] Field of Search................... 188/195, 349, 73.3; 303/22 A, 22 R, 24 A, 24 C, 24 F, 6 C

[56] References Cited

UNITED STATES PATENTS

| 2,924,306 | 2/1960 | Martin ................................ 188/349 |
| 3,362,758 | 1/1968 | Goerke et al. ..................... 303/22 R |
| 3,488,095 | 1/1970 | Rath ............................... 188/349 X |
| 3,527,504 | 9/1970 | Chouings et al. ............. 303/24 A X |
| 3,531,164 | 9/1970 | Francois............................ 303/24 C |
| 3,811,738 | 5/1974 | Carre ................................ 303/22 R |

FOREIGN PATENTS OR APPLICATIONS

| 1,239,289 | 7/1971 | United Kingdom................ 303/22 R |
| 1,388,421 | 12/1964 | France ............................... 303/22 R |
| 1,079,509 | 8/1967 | United Kingdom.................. 188/349 |

Primary Examiner—George E. A. Halvosa
Attorney, Agent, or Firm—Bucknam and Archer

[57] ABSTRACT

This invention relates to automobile braking systems of the kind that employ a device for limiting braking pressure and intended particularly for systems which have separate supply circuits for the front and rear-wheel brakes. Such limiting devices conventionally comprise a limiter body which has an inlet orifice and an outlet orifice with a valve mounted therein for cutting off the inlet orifice from the outlet orifice, a movable piston subject to the hydraulic pressure at the inlet orifice, an inertial mass which is capable of movement with respect to the body, load-sensitive means and elastic means for co-operation with the inertial mass and the piston. In accordance with the present invention, the load sensitive means co-operate via a group of elastic members with the inertial mass and with the piston in the direction in which the valve opens: moreover, the force of the pressure at the inlet orifice is exerted against a working face of the movable piston in opposition to the contrary force exerted by a load, and the valve itself is arranged to be closed as a result of the effect of hydraulic pressure and inertial force.

5 Claims, 3 Drawing Figures

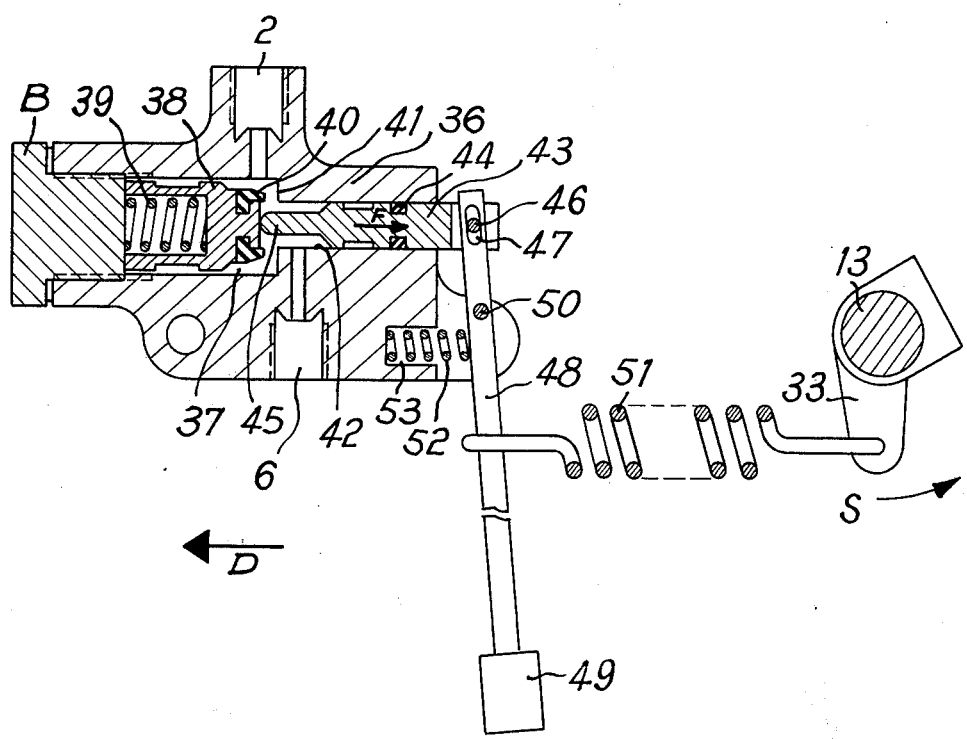

INERTIA AND LOAD RESPONSIVE DEVICE FOR LIMITING BRAKING PRESSURE

BACKGROUND OF THE INVENTION

The present invention relates to inertia-operated devices for limiting braking pressure in automobiles, intended particularly for braking systems which have separate supply circuits for the front-wheel brakes and the rear-wheel brakes of the vehicle.

The invention relates more particularly to such a limiting device which operates to prevent the rear wheels of the vehicle from locking before the front ones but which also allows the braking pressure in the supply circuit to the rear brakes to be increased when the supply circuit to the front brakes is out of action irrespective the load on the vehicle thus ensuring adequate deceleration.

Inertia-operated braking pressure limiters are known in which a ball-bearing forming a valve moves along a ramp and cuts off the supply to the rear brakes. Devices in which the interruption in the supply depends both on the load carried by the vehicle and on deceleration are generally mounted so as to be capable of angular movement about a transverse axis and the angular position of the device varies in response to means which are sensitive to the load on the axle carrying the braked wheels.

However, such a device calls for pressurised flexible pipes and connectors to be used and there is a danger of these being damaged by repeated bending strains. For this reason it is essential to use a fixed limiter device.

Such a device has already been proposed in which the support which carries the inertia mass is not directly subject to variations in load. To this end, the mass is mounted on an elastically deformable support which co-operates with a regulating member on which the brake-operating pressure acts.

Although the control pressure for the limiter is higher the more the vehicle is loaded, specific levels of both hydraulic pressure and vehicle deceleration are required for the supply to the rear brakes to be cut off. If the vehicle slows down only well after the hydraulic pressure has been applied (braking on wet or icy surfaces), it is possible that the hydraulic pressure level at which the support circuit to the rear brakes is cut off may be too high. This method of operation is liable to prevent the vehicle from being held to a straight path of travel.

SUMMARY OF THE INVENTION

In accordance with the present invention, the load-sensitive means co-operate via elastic members with a piston and with the inertial mass in the direction in which the valve opens, and the force of the pressure at the inlet orifice is exerted on the face of the piston in opposition to the contrary force exerted by the load, the valve being closed as a result of the effect of the hydraulic pressure and inertial force.

BRIEF DESCRIPTION OF THE DRAWINGS

In order that the invention may be more clearly understood, reference will now be made to the accompanying drawings which show some embodiments thereof by way of example, and in which:

FIG. 3 shows a cross-sectional view of a second embodiment of such device.

SPECIFIC DESCRIPTION OF PREFERRED EMBODIMENTS

Figure 1:
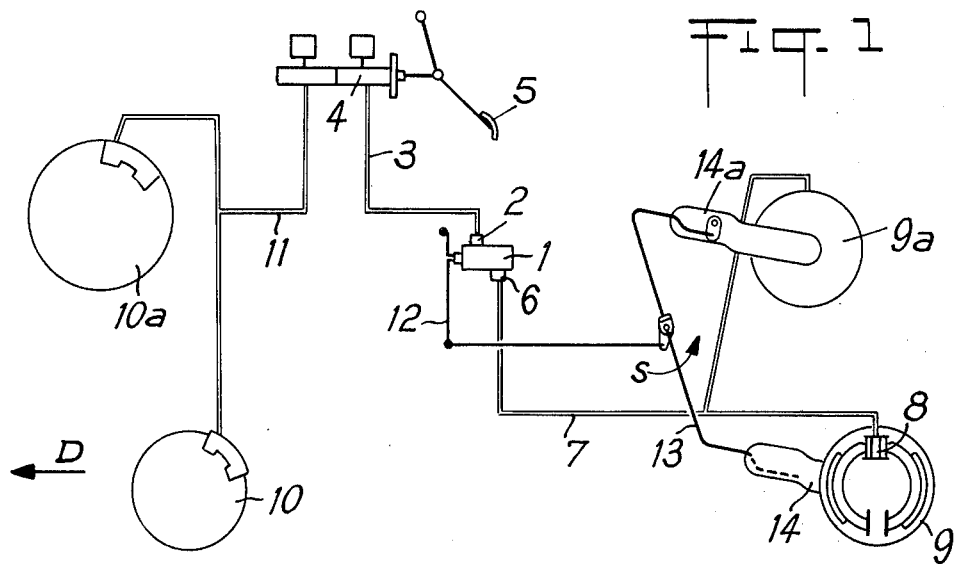
FIG. 1 shows a schematic view of the braking circuit as a whole.

Referring now to the drawings,

FIG. 1 shows a pressure limiter 1 according to the invention having an inlet orifice 2 connected by a pipe 3 to a master cylinder 4 that has a piston reciprocable therewithin by means of a pedal 5. An outlet orifice 6 is connected by a pipe 7 to brake cylinders 8 associated with brakes 9, 9a on the rear wheels.

The master cylinder 4 is directly connected to brakes 10, 10a on the front wheels by a pipe 11.

The pressure limiter 1 is controlled by a linkage 12 connected to means sensitive to the load on the vehicle. To this end, the linkage 12 is connected to an anti-roll bar 13, which is in turn connected to arms 14, 14a associated with the rear wheels. Arrow S indicates the direction in which the anti-roll bar 13 turns when the vehicle is loaded, while arrow D indicates the forward direction of movement of the vehicle.

Figure 2:
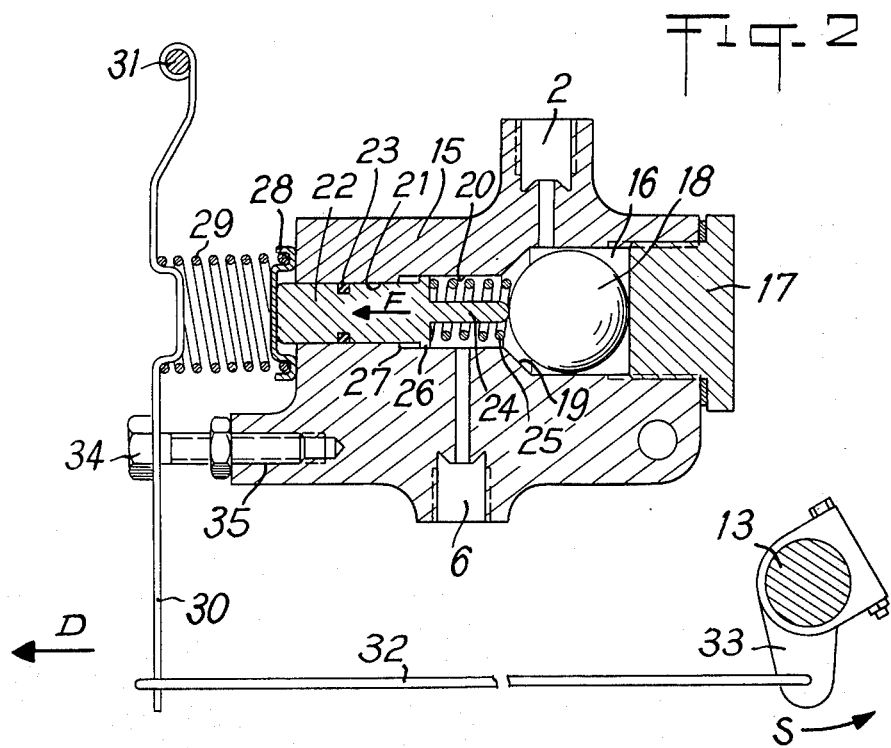
FIG. 2 shows a cross-sectional view of one specific embodiment of pressure-limiting device.

FIG. 2 shows a specific embodiment of the pressure-limiter 1 in greater detail, and in which the limiter comprises a body 15 which contains a chamber 16 which is sealed by a screwed plug 17 and into which the inlet orifice 2 opens.

The chamber 16 holds within it a ball-bearing 18 which forms both an inertial mass (M) and also a valve which co-operates with a seating 19 provided at one end of chamber 16. This end of the chamber joins a passage 20 into which an outlet orifice 6 opens downstream of seating 19, thus allowing inlet orifice 2 to be cut off from outlet orifice 6.

Passage 20 extends into a bore 21 in which a piston 22, which has a sealing joint 23, is mounted to slide. At one end the piston 22 has a stem 24 which co-operates with ball-bearing 18. Between the ball-bearing 18 and the piston 22 is arranged a spring 25 which fits over the stem 24 and tends to thrust the ball-bearing 18 back towards the plug 17 and to move it away from seating 19. Piston 22 has a shoulder 26 which is capable of making contact with a corresponding shoulder 27 provided at the end of passage 20. At the other end piston 22 bears against the bottom of a cup 28 of standardised depth which is inserted between the piston and a spring 29 which bears against an arm 30. One end of arm 30 hinges about a shaft 31 secured to a fixed support member and its other end is connected to a link-rod 32 which is hinged to a lever 33 secured to the anti-roll bar 13.

In the body 15 is an internally threaded hole 35 into which fits a screw 34, against which arm 30 is able to abut so as to ensure that spring 29 is in an initial state of compression and so as to locate piston 22.

When the standardised cup 28 is resting against the body 15 of the limiter, piston 22 is in the correct position. This arrangement allows the pressure limiter to be calibrated at the time of manufacture.

In normal operation, when the driver wishes to decelerate the vehicle, he presses pedal 5 and master cylinder 4 causes an increase in pressure in chamber 16. Beginning from a certain pressure level $p$, which depends on the load, the piston 22 is pressed back in the direction of arrow F, as is also the cup which was originally resting against the body 15.

The stem 24 on piston 22 moves away from in front of ball-bearing 18 and the shoulder 26 of the piston comes up against the shoulder 27 in the body. When this has happened spring 25 is exerting a force Fo on ball-bearing 18.

If the inertial force M$\gamma$ is greater than force Fo, ball-bearing 18 comes up against its seating 19 and interrupts the connection between inlet orifice 2 and outlet orifice 6 and thus cuts the rear brakes off from the rest of the circuit. This happens when the vehicle is subjected to at least a minimum deceleration $\gamma o$ which is dictated by the constructional characteristics of the limiter. If the driver releases pedal 5, the pressure in chamber 16 drops and ball-bearing 18 lifts off seating 19 when the pressure in chamber 16 is substantially equal to the pressure at orifice 6.

Should a fault occur in the circuit to the front brakes, even if the load on the vehicle varies, piston 22 will still only be thrust back in the direction of arrow F when the pressure in chamber 16 has reached the level $p$ appropriate to the load. Ball-bearing 18 will only be able to come up against its seating when acted on by an inertial force which is adequate to compress spring 25 and is thus equivalent to the minimum deceleration $\gamma o$.

FIG. 3 shows another embodiment of pressure-limiter which comprises a body 36 containing a chamber 37 which is sealed by a screwed plug B and into which inlet orifice 2 opens.

A valve 38 is mounted to slide in chamber 37, this valve being subject to the effect of a spring 39 and including a sealing gland 40 which can come to bear against a seating 41 provided at the end of chamber 37.

Chamber 37 extends into a bore 42 into which opens an outlet orifice 6 situated downstream of seating 41, the said bore holding a sliding piston 43 which has a sealing joint 44. As in the previous embodiment piston 43 has a stem 45 capable of coming into contact with valve 38.

At the opposite end from stem 45, piston 43 has a shaft 46 which fits into a slot 47 provided at one end of an arm 48 which has an inertial mass 49, the mass of which is M, at the other end, the said arm being mounted to pivot about a shaft 50 secured to the body 36 of the limiter.

At the centre, arm 48 is connected to a lever 33 fastened to anti-roll bar 13 by a spring 51.

In addition, a safety spring 52, which fits into a seating 53 in the body, bears against arm 48, the said spring 52 ensuring, even without spring 51, that valve 38 is opened and that piston 43 is properly located.

In normal operation, when the driver brakes and presses on pedal 5, master cylinder 4 causes an increase in the pressure $p$ in chamber 37. If S is the cross-sectional area of piston 43, the conditions under which the piston will move in the direction of arrow F are given, ignoring friction, by:

$$pS + Fo > K_1 f1 + K_2 f2 \quad \quad 1.$$

in which $Fo = M\gamma o Ko$
$f1$ = force exerted by spring 51
$f2$ = force exerted by spring 52
$Ko, K_1, K_2$ are constants of force reduction (leverage constants).

Consequently, it can be seen that the force pS due simply to the hydraulic pressure is inadequate to close valve 38 by moving piston 43 back. It is therefore necessary for the sum of the forces exerted by the inertial means 49 and the hydraulic pressure to be greater than the opposing force exerted by springs 51 and 52 against the mass if the valve 38 is to close under the prompting of spring 39.

In the event of a failure in the circuit supplying the front brakes, piston 43 will be thrust back in the direction of arrow F only when the pressure in chamber 37 has reached level p and when deceleration $\gamma = Fo/MKo$ is sufficient for the inequality (1) to be satisfied.

We claim:

1. In an automobile braking system, a device limiting braking pressure comprising a limiter body which has an inlet orifice and an outlet orifice and a valve mounted therein for cutting off said inlet orifice from said outlet orifice, a movable piston subject to the hydraulic pressure at said inlet orifice, an inertial mass disposed within said body for movement with respect to said body in response to deceleration of a vehicle carrying the system and operatively associated with said valve load-sensitive means, and elastic means for cooperation with said inertial mass and said piston, said load-sensitive means cooperating via a group of elastic members with said inertial mass and with said piston in the direction in which said valve opens, and the force of the pressure at said inlet orifice being exerted against a working face of said movable piston in opposition to the contrary force exerted by a load, said valve being closed as a result of the effect of hydraulic pressure and inertial force acting upon said inertial mass at a predetermined vehicle deceleration, the closure of said valve at said predetermined vehicle deceleration being established by the resultant of a plurality of forces including the hydraulic pressure force acting on said piston, the inertial force acting upon said inertial mass upon deceleration of the vehicle, a pre-load force corresponding to vehicle load and applied to said piston through one of said elastic members in a direction opposing said hydraulic pressure force.

2. A pressure-limiting device according to claim 1, wherein said working face of said movable piston, incorporates a stem located to prevent said valve from closing as long as the sum of the pressure force at said inlet orifice and the inertial force is less than the opposing force exerted by the load and said group of elastic members.

3. A pressure-limiting device according to claim 2, wherein said valve is formed by a ball-bearing which constitutes said inertial mass and which is arranged in a chamber formed in said body of said limiter, said chamber being connected to said inlet orifice and to said outlet orifice via a valve seating.

4. A pressure-limiting device according to claim 3, wherein one end of a spring whose other end co-operates with said ball-bearing forming said valve, rests against said working face of said piston.

5. A pressure-limiting device according to claim 2, wherein the end of said piston opposite said stem rests against a cup which is acted on by a spring which bears against an arm, one end of which is mounted to pivot on a fixed support member and the other end of which is connected by a linkage to load-sensitive means.

* * * * *